United States Patent [19]

Lapsa et al.

[11] Patent Number: 5,213,506
[45] Date of Patent: May 25, 1993

[54] BINARY EDUCATIONAL DEVICE

[76] Inventors: Paul M. Lapsa; Jeanne W. Lapsa; Ingrid A. Lapsa; Gaida T. Lapsa; Andrew P. Lapsa, all of 640 Earl Dr., State College, Pa. 16803

[21] Appl. No.: 680,556

[22] Filed: Apr. 4, 1991

[51] Int. Cl.$^5$ .................. G09B 19/00; G09B 19/02
[52] U.S. Cl. .................. 434/118; 434/189; 434/208
[58] Field of Search .......... 434/118, 189, 208; 273/11, 118 D, 120 R; 235/68, 127; 209/547

[56] References Cited

U.S. PATENT DOCUMENTS

| | | |
|---|---|---|
| 3,006,082 | 10/1961 | Libbey . |
| 3,278,187 | 2/1964 | Sinden ........................ 273/118 R |
| 3,331,143 | 7/1967 | Weisbecker . |
| 3,388,483 | 6/1968 | Weisbecker .................... 434/118 |
| 3,390,471 | 7/1968 | Godfrey . |
| 3,643,347 | 2/1972 | Ziering . |
| 3,994,076 | 11/1976 | Bertman ................... 273/118 D X |

Primary Examiner—Richard J. Apley
Assistant Examiner—John P. Leubecker
Attorney, Agent, or Firm—Aquilino & Welsh

[57] ABSTRACT

A binary computer for demonstrating concepts of decimal to binary conversion and binary operations such as counting, addition, subtraction and multiplication is provided. Further, the binary computer is capable of demonstrating the computer concepts of bit, byte, memory, flip-flop, serial input and parallel input. A plurality of pointer-shaped flip-flops function as an information storage facility or memory and are a central concept in the design.

11 Claims, 2 Drawing Sheets

BINARY EDUCATIONAL DEVICE

FIELD OF THE INVENTION

This invention relates generally to binary computers and in particular, to a binary computer that can be used as an educational device to demonstrate decimal to binary conversion as well as many other binary operations such as counting, addition, subtraction and multiplication.

BACKGROUND OF THE INVENTION

The invention was developed in order to provide an educational device for all ages to aid in the understanding of numerous computer concepts. The device is not only simple to use but is also easy to assemble, thereby providing a hands on educational device which will hold the interest of children and adults of all ages.

The below listed prior art show other educational devices but none of these devices are structurally similar and they fail to provide a device which teaches numerous computer concepts and terms.

U.S. Pat. No. 3,390,471 issued to Godfrey on Jul. 2, 1968 for a Binary Digital Computer discloses an educational device for learning computer relationships that includes a plurality of flip-flops moved by rolling balls. In a basic embodiment, the computer of Godfrey includes impulsing means, table surfaces, a distributor formed of a plurality of flip-flops, an accumulator register formed of a plurality of flip-flops, a first guide means and an addend register formed of a plurality of switches.

U.S. Pat. No. 3,006,082 issued to Libbey On Oct. 31, 1961 discloses an Educational Device For Teaching Binary Computation. The device includes double-armed relay members that are gravitationally actuated by balls rolling down slanted ramps or guide means.

U.S. Pat. No. 3,643,347 issued to Ziering on Feb. 22, 1972 shows a Numeral Base Conversion Instructional Device for teaching conversion between numeral bases. The device includes a plurality of measuring units in combination with at least three different areas for storing or collecting the units.

U.S. Pat. No. 3,331,143 issued to Weisbecker on Jul. 18, 1967 shows a Computer Type Device wherein a ball, check or the like is inserted into a receiver having a pair of paths and passes through a particular path corresponding to the open position of a direction element in the receiver.

It is desirable to provide a simplified binary computer that demonstrates the concepts of decimal to binary conversion, binary counting, addition, subtraction and multiplication in a manner that is both intuitive and entertaining for adults and children.

SUMMARY OF THE INVENTION

The invention is a binary computer constructed on a substantially rectangular support or backboard that has four edges and an upper surface. The support is mounted along a first edge at an angle with respect to a horizontal surface. A plurality of parallel guide flanges extending from the upper surface of the support or backboard in a substantially perpendicular relationship to the first edge form input channels for guiding spheroids. A plurality of substantially pointer-shaped flip-flops are pivoted at points disposed linearly with and spaced from the guide flanges so as to permit rotation of the flip-flops about their respective pivot points. Leftward rotation of each flip-flop is limited by the guide flange immediately adjacent and to the left of the guide flange under which that flip-flop is pivoted. Rightward motion limiting flanges are also provided and also extend from an upper surface of the support or backboard in substantially parallel relationship to the guide flanges. Accordingly, the range of motion of each flip-flop is limited so that each flip-flop will rest in only one of two positions. The length of each guide flange, and thereby each input channel, is determined so that a spheroid can enter the channel by being released into that channel or from the input channel immediately to the right, depending on the position of the flip-flop positioned therebetween.

Parallel input ports and a serial input port are provided. An input gate for maintaining spheroids in the parallel input ports until the input gate is withdrawn is also provided. A collection tray for retaining spheroids after travel through the binary computer is another feature of the invention.

Other features and advantages of the binary computer of the invention will become apparent from the following detailed description.

BRIEF DESCRIPTION OF THE DRAWINGS

The invention will be better understood with reference to the accompanying drawings wherein.

DETAILED DESCRIPTION OF THE PREFERRED EMBODIMENTS

Figure 1:
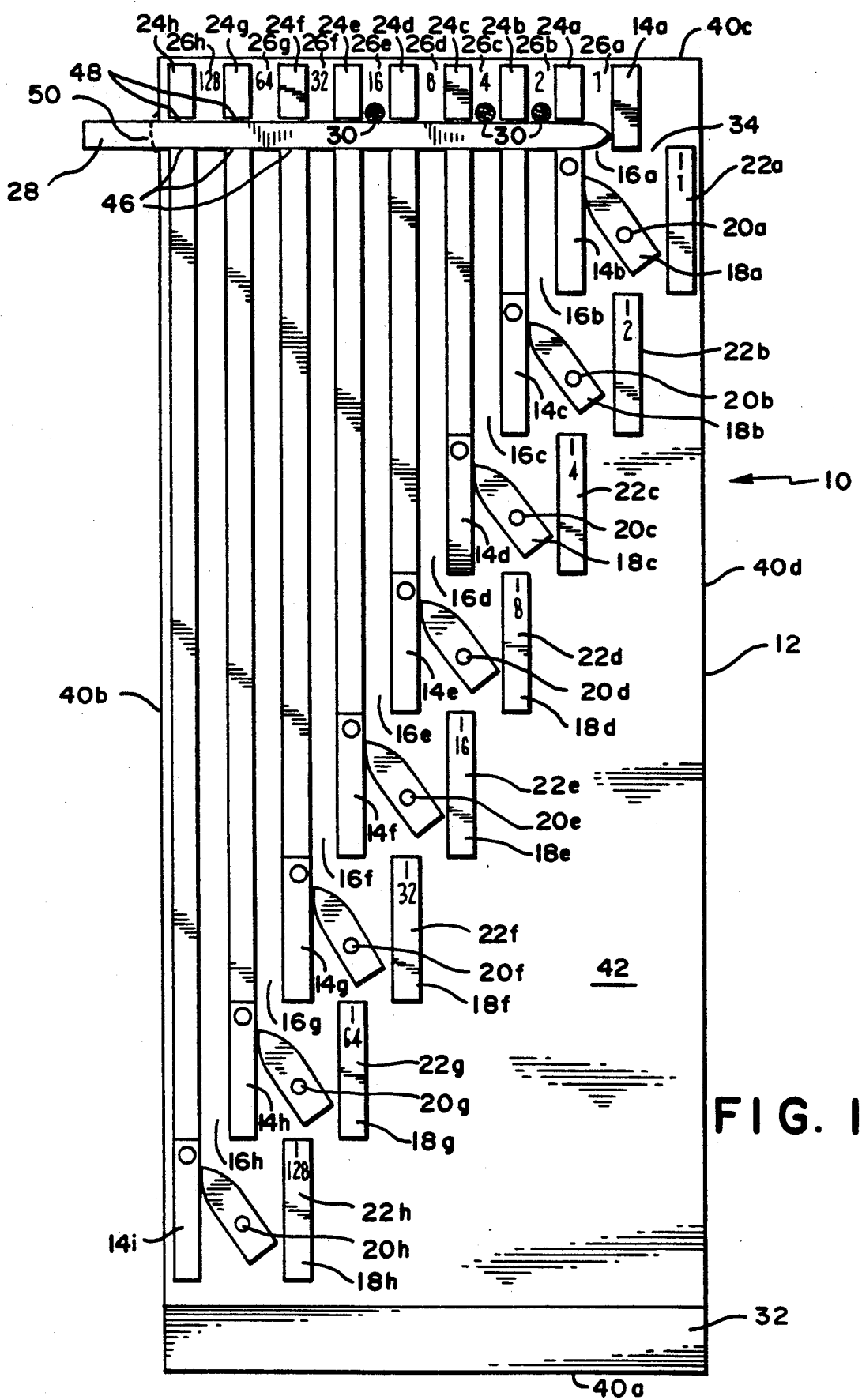
FIG. 1 is a front plan view of a Marbletronic binary computer constructed and arranged in accordance with the invention.
Figure 2:
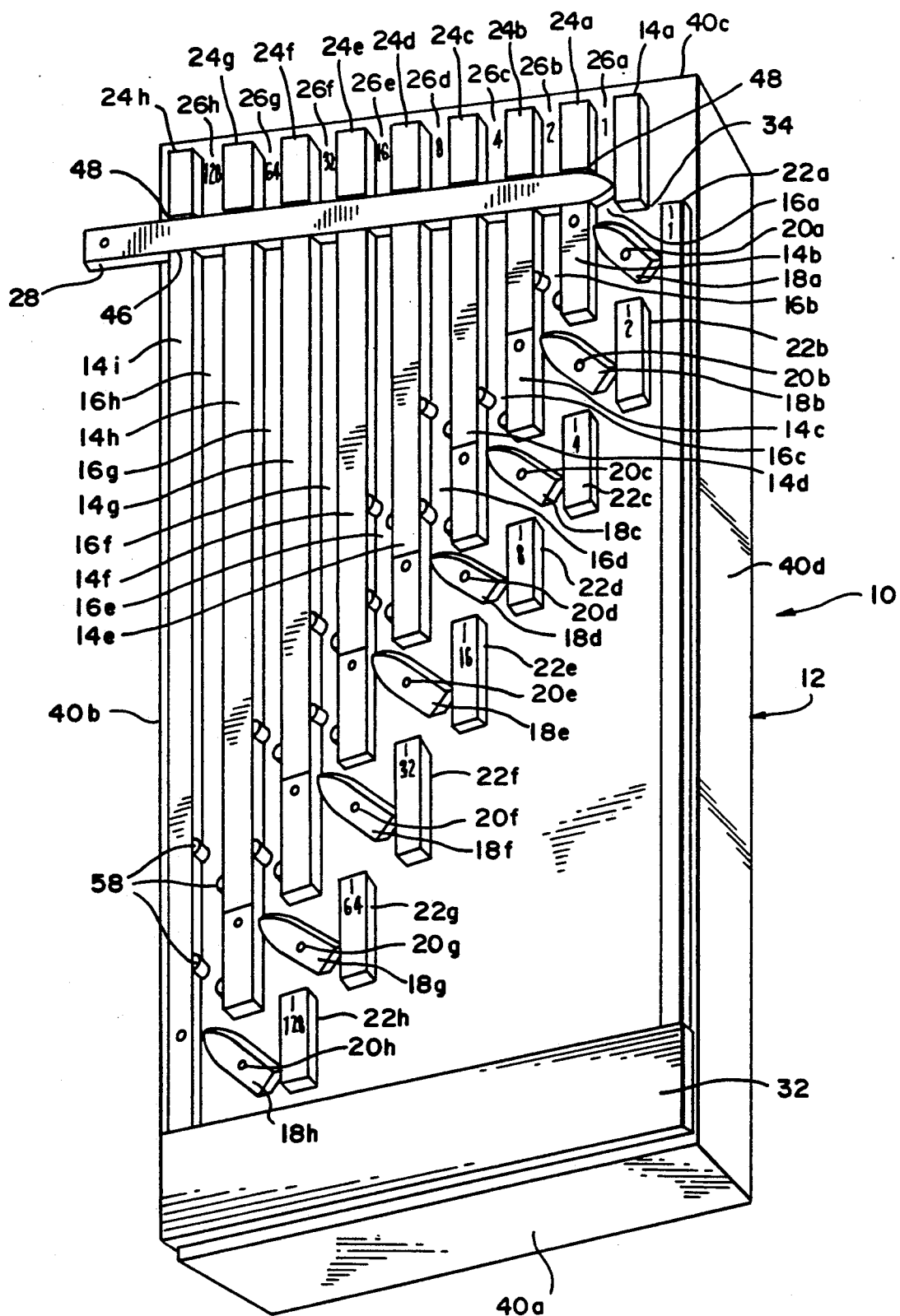
FIG. 2 is a perspective view of a Marbletronic binary computer constructed and arranged in accordance with the preferred embodiment of the invention.

A binary computer 10 constructed and arranged in accordance with the invention is mounted on a support or backboard 12. The support or backboard 12 is substantially rectangular in shape and has four edges 40a–d and an upper surface 42. The support is mounted along a first edge 40a at an angle with respect to a horizontal surface 44 (not shown). The angle is generally greater than about 0° and less than or equal to about 90°. The angled orientation of the support 12 allows spheroids or marbles 30 to roll in the direction from a second edge 40c located opposite the first edge 40a towards the first edge 40a due to gravitational forces acting on the spheroids 30.

The support or backboard 12 can be formed of any suitable material with sufficient rigidity to permit the spheroids 30 to roll thereon without causing substantial deformation and with sufficient smoothness to facilitate rolling of the spheroids. Suitable materials include, but are not limited to, wood, plastic, metal and the like.

Substantially rigid guide flanges 14a–i extend from the upper surface 42 of the support 12. Each guide flange 14a–i has a first end 46 in substantially proximal relationship to the second edge 40c of the support 12. Each guide flange 14a–i extends substantially perpendicular with respect to both of the first and second edges 40a and 40c and substantially parallel with respect to third and fourth edges 40b and 40d. The lengths of the guide flanges 14a–i are arranged so that the rightmost guide flange 14a extends the shortest distance towards the first edge 40a and the leftmost guide flange 14i extends the longest distance towards the first edge

40a. The intermediate guide flanges 14b–h increase in length in successive fixed increments from right to left.

The guide flanges 14a–i can be formed, for example, by securing raised members to the support 12 using conventional securing means such as adhesive, nails or the like. Alternatively, the guide flanges 14a–i can be provided using conventional molding or forming techniques if, for example, the support 12 is a plastic material.

The guide flanges 14a–i form n input channels 16a–h therebetween, wherein n is an integer greater than or equal to 1. The number of guide flanges necessary for forming n input channels is always (n+1). Each input channel 16a–h corresponds to a number represented by $2^{n-1}$, wherein n represents the number of the input channel counting from the right to the left. Therefore, the first channel, which is designated 16a, represents $2^{1-1}$ or $2^0$, which is equal to 1. Correspondingly, the second channel designated 16b represents $2^{2-1}$ or $2^1$, which is equal to 2, and so on. The number value of each channel can be written or indicated in or near the channel since these values are constant and do not change.

The n substantially pointer-shaped flip-flops 18a–h are pivotally mounted on the backboard 12 so as to be rotatably movable about their pivot points 20a–h. The pivot points 20a–h are located substantially linearly with and spaced from each of the n rightmost guide flanges 14a–h, respectively. The spacing permits each flip-flop 18a–h to rotate without interfering with the guide flange 14a–h that the pivot point 20a–h of that flip-flop 18a–h is in line with. However, the leftward motion of each flip-flop 18a–h is limited by the guide flange 14b–i immediately to the left of the guide flange 14a–h that flip-flop 18a–h is in line with. For example, flip-flop 18a pivots about a pivot point 20a that is substantially linear with and spaced from guide flange 14a so as to permit rotation with respect to guide flange 14a. However, the leftward motion of flip-flop 14a is limited by the guide flange 14b, which is disposed immediately to the left of the guide flange 14a.

Rightward motion limiting flanges 22a–h also extend upwardly from the support 12 in the manner described with respect to the guide flanges 14a–i and are separately located and parallel to these guide flanges. The rightward motion limiting flanges 22a–h limit the rightward motion of the pointer shaped flip-flops 18a–h and function as a stop in a manner similar to that described in connection with the leftward motion of the flip-flops 18a–h. The rightmost rightward motion limiting flange 22a is equal in length to the leftmost guide flange 14i, thereby preventing marbles 30 from rolling off upper surface 42.

Since each flip-flop 18a–h is unbalanced with respect to its pivot 20a–h, the flip-flops 18a–h will always rest in one of two positions. Specifically, each flip-flop 18a–h will point towards the left and rest on a guide flange 14b–i or towards the right and rest on a rightward motion limiting flange 22a–h. When the flip-flops 18a–h points towards the left, a binary 0 is represented; when the flip-flop 18a–h points towards the right, a binary 1 is represented. In a preferred embodiment, each of guide flanges 14b–i has a "zero" imprinted, affixed or otherwise indicated thereon and each of rightward motion limiting flanges 22a–h has a "one" imprinted, affixed or otherwise indicated thereon.

The length of each input channel 16a–h is determined by the length of the guide flanges 14a–i and is arranged so that a spheroid can enter the input channel 16a–h by being released directly into that input channel or from the input channel 16a–g immediately to the right. For example, a spheroid can enter input channel 16b by being released directly into input channel 16b or from input channel 16a, which is positioned immediately to the right of input channel 16b. The spheroid will enter input channel 16b from input channel 16a when both pointer-shaped flip-flops 18a and 18b are in a rightward pointing position such that their motion is limited by rightward motion limiting flanges 22a and 22b, respectively.

Entry port defining flanges 24a–h are also provided and extend upwardly from the upper surface 42 of the support 12 between the first end 46 of the guide flanges 14b–i and the second edge 40c of the support 12. Each entry port defining flange 24a–h is substantially linear with and spaced from an opposing guide flange 14b–i. In the embodiment shown, there are n entry port defining flanges and (n+1) guide flanges so that entry port defining flange 24a corresponds to guide flange 14b, entry flange 24b corresponds to guide flange 14c and so on. A space 50 is formed between the opposing end 48 of each entry port defining flange 24a–h and the first end 46 of each guide flange 14a–i. Entry port defining flanges 24a–h have characteristics similar to guide flanges 14a–i and rightward motion limiting flanges 22a–h and can be formed in the manner and of the materials described.

Parallel ports 26b–h leading into input channels 16b–h are formed between each pair of adjacent entry port defining flanges 24a–h. In fact, guide flange 14a functions as an entry port defining flange for the purpose of forming a parallel port 26a between guide flange 14a and entry port defining flange 24a. However, guide flange 14a is longer than the entry port defining flanges 24a–h and also serves to form input channel 16a.

An solid input gate 28 fits in the space 50 between the opposing end 48 of the entry flanges 24a–h and the first end 46 of the guide flanges 14b–i. Guide flange 14a functions as a stop for the input gate 28. Maintenance of the input gate 28 in the space 50 permits marbles or spheroids 30 to be retained in the parallel ports 26a–h. However, the input gate 28 preferably extends past the left edge 40b of the support 12 so as to provide a handle with which it can be withdrawn from the space 50. The input gate 28 is withdrawn to the left to release the marbles 30 into the input channels 16a–h for flow through binary computer 10.

In order to slow the speed of travel of the marbles 30 through the input channels 16b–h, bumpers 58 are installed therein. Bumpers 58 are positioned above flip-flops 18 and function to slow the marbles 30 down before the marbles strike the flip-flops 18. If the marbles travel too fast, they strike with too much force and the flip-flops bounce them back and forth resulting in incorrect settings.

A serial port 34 is also formed between the first guide flange 14a and the first rightward motion limiting flange 22a. The serial port 34 is useful for teaching binary counting since only one spheroid 30 can be entered at a time.

A collection tray 32 is also provided adjacent the first edge 40a of the support 12 for collecting spheroids 30 that have passed through the computer 10. The collection tray 32 may be any suitable size and shape for accomplishing this result.

To use the binary computer 10, each flip-flop 18a–h is initialized to 0 by pointing the flip-flop 18a–h towards the left so that it rests against the next leftward adjacent guide flange 14b–i, which may have the numeral 0 thereon. To count using the serial port 34 formed between guide flange 14a and motion limiting flange 22a, one spheroid 30 at a time is dropped through serial port 34. The spheroid 30 will roll from the serial port 34 towards the first edge 40a of the support 12 due to gravity acting on the spheroid 30. As it does so, spheroid 30 will toggle flip-flop 18a so that its pointer points towards rightward motion limiting flange 22a, which may have a 1 represented thereon, and spheroid 30 will then drop through the space between rightward motion limiting flange 22a and rightward motion limiting flange 22b. All of the remaining flip-flops 18a–h will still point to zero. The number 1 in binary is then read by reading each flip-flop from left to right and is 00000001 or 1. After rolling through the computer 10, the spheroid 30 will then be collected in the collection tray 32.

When a second spheroid 30 is dropped through serial port 34, flip-flop 18a will be toggled back to zero and the spheroid 30 will drop between guide flange 14b and rightward motion limiting flange 22b. This in turn will toggle flip-flop 18b which will then point towards rightward motion limiting flange 22b. The spheroid 30 will fall from the computer between motion limiting flanges 22b and 22c. Accordingly, to represent the number 2 in binary code, the second flip-flop 18b will point toward motion limiting flange 22b having the number 1 thereon and flip-flop 18a will point towards the zero on guide flange 14b. Accordingly, the number 2 is represented in binary by the digits 00000010 or 10. Introduction of a third spheroid through serial port 34 will again toggle only the first flip-flop 18a indicating that the number 3 is represented in binary as 00000011 or 11. Counting can be continued in this manner always reading the flip-flops in the computer from left to right.

Alternatively, a number can be entered into the computer by dropping spheroids through parallel ports 26a–h upon removal of input gate 28. Since each parallel port 26a–h has a number value associated with it, a spheroid 30 in that port 26–h stands for that number. For example, in the embodiment shown, spheroids are positioned in parallel ports 26b, 26c and 26e, representing the numbers 2, 4 and 16, respectively. The number represented is the total of these numbers, or 22. By removing input gate 28, the spheroids 30 will travel through the computer 10 and the number 22 in binary will be shown by the flip-flops 18a–h as 00010110 or 10110. Another number can then be added to the first number using the same parallel ports. The addition sum is again read in binary from a left to right reading of the flip-flops 18a–h.

It is possible to enter as many addends as desired. However, the maximum number that can be displayed by the flip-flops 18a–h is $2^n - 1$, wherein n is the number of flip-flops. Overflow beyond this limit will cause the device to recycle from zero. Consequently, the binary computer 10 provided in accordance with the invention is a finite state machine that carries out modulo-$2^n$ arithmetic. The embodiment shown of the binary computer 10 contains eight flip-flops 18a–h and has a computing limit of $2^8 - 1$ or 255. In standard computer terminology, eight bits constitutes one byte, which is the most common unit for specifying the capacity of computer memories.

The binary computer constructed and arranged in accordance with the invention can be used to demonstrate the computer concepts of binary enumeration systems, binary/decimal conversion, counting, adding, subtracting, multiplying, carrying, overflow, modulo arithmetic, bit, byte, memory, flip-flop, serial input and parallel input. It does so in visible and entertaining fashion without requiring knowledge or use of electronics, electricity or magnetism. Therefore, it is suitable for adults as well as for children. The entertainment value of the binary computer stems from the visual effects of the spheroids progressing through the channels to toggle the flip-flops and from the auditory clicks and clacks accompanying the operation.

Another important feature of the Marbletronic binary compute is that its construction is so simple that the device may be packaged as a kit. The parts would be labeled and an instruction sheet and diagram would be provided so that the user could learn while they build the device. The kit would include a support 12, a plurality of guide flanges 14a–i to be mounted on the support 12, a plurality of flip-flops 18a–h to be pivotally mounted on the support 12, a plurality of rightward motion limiting flanges 22a–h to be mounted on the support 12, a plurality of entry port flanges 24a–h to be mounted on the support 12, an input gate 28 which cooperates with the plurality of entry port flanges 24a–h and the plurality of guide flanges 14a–i, a collection tray 32 to be mounted to a first support edge and a plurality of marbles 30 for operating the assembled device. The kit may also include optional labels for attachment to the assembled Marbletronic binary computer for numbering the parallel ports, the guide flanges, and the rightward motion limiting flanges and identifying the parallel and serial ports.

While various preferred embodiments have been shown and described, it will be understood that there is no intent to limit the invention by such disclosure but, rather, it is intended to cover all modifications and alternate constructions falling within the spirit and scope of the invention as defined in the appended claims.

What is claimed is:

1. An educational device for teaching binary computation for use with at least one spheroid for indicating a condition comprising:

a support having an upper surface which is adapted to be positioned along a first edge so as to form an angle greater than 0° and less than or equal to 90° between the support and a horizontal surface;

(n+1) guide flanges extending from the upper surface of the support, such that each guide flange has a first end in proximal relationship to a second edge of the support opposite the first edge so as to define a linear continuous channel between each pair of adjacent guide flanges and wherein said guide flanges are disposed substantially parallel to one another so as to form n input channels therebetween, wherein n is an integer greater than or equal to 1;

n substantially pointer-shaped flip-flops pivoted about pivot points disposed linearly with the n right-most guide flanges and in spaced relation thereto so as to permit each flip-flop to pivot about its pivot point in such a way that the leftward motion of each pointer-shaped flip-flop is limited by the guide flange immediately to the left of the guide flange under which the pivot point of that flip-flop is disposed;

n rightward motion limiting flanges extending from the upper surface of the support separate from and parallel to the guide flanges and spaced so as to limit the rightward motion of each pointer-shaped flip-flop;

wherein the length of each channel is arranged so that a spheroid can enter each channel by being released into that channel or from the channel immediately to the right; and, wherein each channel corresponds to a number value and wherein a decimal number value of each input channel is indicated in or near that channel.

2. The binary computer of claim 1 wherein the computer further comprises n entry port defining flanges extending from the upper surface of the support between the first end of the n leftmost guide flanges and the second edge of the support so as to be substantially linear with and spaced from the guide flanges and to form n parallel entry ports between each pair of adjacent entry port defining flanges and wherein the rightmost entry port defining flange functions in cooperation with the rightmost guide flange to form the rightmost parallel entry port therebetween.

3. The binary computer of claim 2 wherein a solid removable input gate fits into a space defined between the first end of the guide flanges and an opposing end of the entry port defining flanges so as to maintain spheroids in position in the parallel entry ports until the input gate is removed.

4. The binary computer of claim 3 wherein the rightmost guide flange functions as a stop for the removable input gate.

5. The binary computer of claim 1 wherein a serial port is defined between the rightmost guide flange and the rightmost rightward motion limiting flange.

6. The binary computer of claim 1 wherein the computer further comprises a collection tray provided adjacent the first edge of the support for collecting spheroids that have passed through the computer.

7. An educational device for teaching binary computation for use with at least one spheroid for indicating a condition comprising:

a support having an upper surface which is adapted to be positioned along a first edge so as to form an angle greater than 0° and less than or equal to 90° between the support and a horizontal surface;

(n+1) guide flanges extending from the upper surface of the support such that each guide flange has a first end in proximal relationship to a second edge of the support opposite the first edge so as to define a linear continuous channel between each pair of adjacent guide flanges and wherein each guide flange is disposed substantially perpendicular to both the first and second edges so as to form n input channels therebetween, wherein n is an integer greater than or equal to 1;

n entry port defining flanges extending from the upper surface of the support between the first end of the leftmost guide flanges and the second edge of the support so as to be substantially linear with and spaced from each of the guide flanges and to form parallel entry ports between each pair of adjacent entry port defining flanges and wherein the rightmost entry port defining flange functions in cooperation with the rightmost guide flange to form the rightmost parallel entry port therebetween;

n substantially pointer-shaped flip-flops pivoted about pivot points disposed linearly with the n right-most guide flanges and in spaced relation thereto so as to permit each flip-flop to pivot about its pivot point in such a way that the leftward motion of each pointer-shaped flip-flop is limited by the guide flange immediately to the left of the guide flange under which the pivot point of that flip-flop is disposed;

n rightward motion limiting flanges extending from the upper surface of the support separate from and parallel to the guide flanges and spaced so as to limit the rightward motion of each pointer-shaped flip-flop;

wherein the length of each channel is arranged so that a spheroid can enter each channel by being released directly into that channel or from the channel immediately to the right; and, wherein each of said entry port flanges corresponds to a number value and wherein a decimal number value of each input channel is indicated in or near that channel.

8. The binary computer of claim 7 wherein a solid removable input gate fits into a space defined between the first end of the guide flanges and an opposing end of the entry port defining flange so as to maintain spheroids in position in the parallel entry ports until the input gate is removed.

9. The binary computer of claim 8 wherein the rightmost guide flange functions as a stop for the removable input gate.

10. The binary computer of claim 7 wherein a serial port is defined between the rightmost guide flange and the rightmost rightward motion limiting flange.

11. The binary computer of claim 7 wherein the computer further comprises a collection tray positioned substantially adjacent the first edge of the support for collecting spheroids that have passed through the computer.

* * * * *